(12) United States Patent
Scott (10) Patent No.: US 7,384,704 B2
(45) Date of Patent: Jun. 10, 2008

(54) METHODS AND APPARATUS FOR CONTROLLING THE TEMPERATURE OF AN AUTOMOBILE BATTERY

(75) Inventor: David S Scott, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 922 days.

(21) Appl. No.: 10/739,789

(22) Filed: Dec. 18, 2003

(65) Prior Publication Data

US 2005/0133206 A1 Jun. 23, 2005

(51) Int. Cl.
*H01M 10/50* (2006.01)

(52) U.S. Cl. ................. 429/62; 180/68.5; 165/122; 136/204

(58) Field of Classification Search ........ 136/200–242; 429/7, 62, 120; 165/122; 320/150; 180/68.5
See application file for complete search history.

(56) References Cited

U.S. PATENT DOCUMENTS 4,314,008 A 2/1982 Blake
6,533,031 B1 3/2003 Garcia et al.
6,645,666 B1 * 11/2003 Moores et al. .............. 429/120

FOREIGN PATENT DOCUMENTS

WO WO03001313 A1 * 1/2003

OTHER PUBLICATIONS

Olson, J.B. et al, "Development of a Spiral Wound Advanced Lead-Acid EV Battery" 11th Ann. Battery Conf. on Appl. and Advances. pp. 167-172 (Jan. 1996).*
Buchmann, Isidor, "Can the lead-acid battery compete in modern times?", from website http://www.batteryuniversity.com/partone-6.htm. Jul. 2003. (3 pages).*
Pesaran, A.A. et al, "Thermal Performance of EV and HEV Battery Modules and Packs". 14th Intl. Electric Vehicle Symposium. 11 pages. (Dec. 1997).*

* cited by examiner

*Primary Examiner*—Nam Nguyen
*Assistant Examiner*—Jeffrey Barton (57) ABSTRACT

A method and apparatus maintain the temperature of a automobile battery within a predetermined temperature range even though the ambient temperature is outside of the predetermined temperature range. The apparatus and the method utilize a thermoelectric device that provides lower temperatures on one surface and higher temperature on another surface thereof in response to the direction of an electrical current passing through the device. The thermoelectric device is thermally coupled by a fan, air ducts and a heat transfer structure between the automobile battery and the ambient atmosphere. An electrical circuit having a heat sensor is thermally coupled to the automobile battery and selectively controls the current through the thermoelectric device to maintain the temperature of the automobile battery within the predetermined temperature range.

11 Claims, 7 Drawing Sheets

FIG. 2B
section B:B

METHODS AND APPARATUS FOR CONTROLLING THE TEMPERATURE OF AN AUTOMOBILE BATTERY

TECHNICAL FIELD

The present invention relates generally to temperature control of an automobile battery, and more specifically to methods and apparatus for controlling the temperature of an automobile battery in order to maintain the temperature within a predetermined temperature range.

BACKGROUND

Modern motor vehicles, such as automobiles, generally include electrical systems that include one or more storage batteries (e.g., rechargeable lead acid storage batteries) and alternators that cooperatively provide the electrical power for many vehicle functions. For example, the automobile battery provides electrical power to start the vehicle engine and also provides the electrical power to operate various vehicle accessories when the alternator is providing insufficient power to meet the electrical demands of the vehicle. Presently, vehicles are being designed that include more accessories than in the past (e.g., heated cup holders and temperature controlled seats) to meet the desires of drivers and passengers. Accordingly, such vehicles have a greater dependence on the batteries. As automotive vehicles continue to evolve, forecasts predict that even more electrically enabled functions will be provided to accommodate increasing driver and passenger desires, which further increases the future importance of the batteries.

It is well known that the exposure of batteries to either adversely hot or cold temperatures for prolonged periods has a deleterious effect on operating output performances, recharging abilities and operating lifetime. Automotive batteries are typically located in or near internal combustion engines that produce high temperatures, which tend to undesirably heat the batteries. High ambient temperatures external to the automobile can further elevate the temperatures of the batteries and conversely, low ambient temperatures external to the automobile can undesirably decrease battery temperatures.

For example, the desired temperature for operation of a lead acid battery is approximately twenty-five degrees centigrade (25° C.) and temperatures less than this temperature can diminished electrochemical activity, which results in the battery having an output voltage with a lower magnitude and less than maximum discharge current. Moreover, the useful life of a lead acid battery is cut in half for approximately every increase of ten degrees centigrade (10° C.) in battery temperature that is greater than about twenty-five degrees centigrade 25 (10° C.).

Prior to the present invention, insulating cases have been provided for at least partially isolating automotive batteries from the heat created by the vehicle engine and from the ambient temperature extremes. However, the insulating cases can undesirably subject batteries to trapped heat, for example. Other more sophisticated prior art battery temperature control systems have employed expensive compressors designed to circulate a refrigerant through a cold plate for cooling a battery and/or heat sinks for dissipating heat from the battery. Moreover, electric heaters employing resistive elements heated by electricity have been used to warm batteries subjected to adversely cold temperatures.

In view of the foregoing, it should be appreciated that there is a need to provide improved apparatuses for controlling the temperature of a battery in order to maintain the temperature of the battery within a predetermined temperature range. In addition, there is a need to provide improved methods for controlling the temperature of a battery in order to maintain the temperature of the battery within a predetermined temperature range. It is desirable that such temperature control methods and apparatus are relatively inexpensive, simple, efficient, reliable and expeditious. Furthermore, other desirable features and characteristics of the present invention will become apparent from the subsequent brief summary, detailed description, appended claims, and abstract, taken in conjunction with the accompanying drawings and the foregoing technical field and background.

BRIEF SUMMARY

An apparatus is provided for controlling the temperature of an automobile battery to maintain the temperature within a predetermined temperature range. The apparatus includes an electrical current source configured to generate an electrical current with a direction and a thermoelectric device having a first surface and a second surface. The thermoelectric device is configured to generate a first temperature on the first surface and a second temperature on the second surface that is greater than the first temperature if the direction of the electrical current has a first direction. In addition, the thermoelectric device is configured to generate a third temperature on the first surface and a fourth temperature on the second surface that is less than the third temperature if the direction of electrical current has a second direction. The apparatus further includes a control circuit configured that is configured to adjust the direction of the electrical current generated by the electrical current source in response to relationship of the temperature of the automobile battery to the predetermined temperature range. Moreover, the apparatus includes a heat exchanger having a first air duct with a first airflow that is configured to thermally couple the first surface of the thermoelectric device to the ambient atmosphere and a second air duct with a second airflow that is configured to thermally couple the second surface of the thermoelectric device to the automobile battery.

A method is also provided for controlling the temperature of an automobile battery to maintain the temperature within a predetermined temperature range. The method includes the steps of generating a first temperature on a first surface of a thermoelectric device if an electrical current passing through the thermoelectric device has a first direction and generating a second temperature on a second surface of the thermoelectric device that is greater than the first temperature if the electrical current passing through the thermoelectric device has the first direction. In addition, the method includes generating a third temperature on the first surface of the thermoelectric device if the electrical current passing through the thermoelectric device has a second direction and generating a fourth temperature on the second surface of the thermoelectric device that is less than the third temperature if the electrical current passing through the thermoelectric device has the second direction. Furthermore, the method includes thermally coupling the first surface of the thermoelectric device to the surface of the automobile battery with a first air duct and thermally coupling the second surface of the thermoelectric device to the ambient atmosphere with a second air duct. Moreover, the method includes measuring the temperature of the automobile battery and controlling the electrical current passing through the thermoelectric device in response to the measurement of the temperature of the automobile battery and a relationship of the temperature to the predetermined temperature range.

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
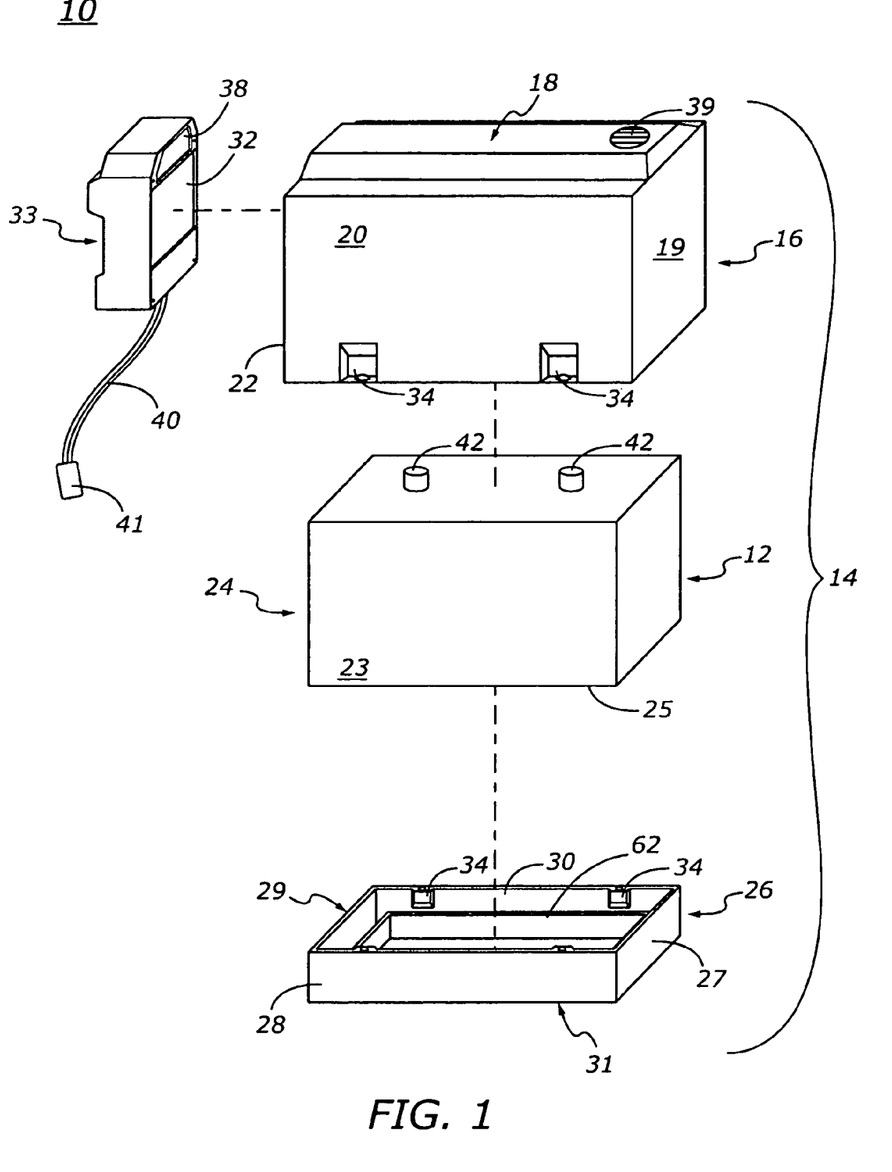
FIG. 1 is an exploded perspective view of an automotive battery and a temperature control apparatus in accordance with a first exemplary embodiment of the invention.

Referring to FIG. 1, an exploded perspective view is shown of a temperature control apparatus 10 for an automotive battery 12 in accordance with an exemplary embodiment of the present invention. Apparatus 10 can maintain the internal temperature of the battery, which in this exemplary embodiment is a rechargeable battery such as a rechargeable lead acid storage battery, within a predetermined temperature range even though apparatus 10 is exposed to a surrounding or ambient atmosphere that can have hostile or adverse temperatures that are substantially higher or lower than the predetermined temperature range, which can be any number of temperatures ranges. For example, in accordance with one exemplary embodiment, the temperature range can be between negative twenty degrees centigrade (−20° C.) and positive fifty degrees centigrade (+50° C.). Maintaining the internal temperature of battery 12 within this temperature range (i.e., heating or cooling battery 12 when the temperature of the battery falls below or exceeds the predetermined temperature thresholds of the temperature range) has numerous advantages, such as enhancing battery performance and extending battery life.

Apparatus 10 preferably includes an insulating enclosure or case 14 for housing battery 12. Enclosure 14 can be made of a lightweight heat insulating material such as either cross-linked polypropylene or fiberglass for instance, which can have a thickness of approximately one-half inch. Enclosure 14 has a top or upper portion 16 having a top 18 and side walls, such as walls 19, 20 and 22. The top 18 and walls 19, 20 and 22 of top portion 16 substantially enclose and preferably encloses all of battery 12 except for the lower portion 23, a portion of the end 24 and the bottom 25 of battery 12. Bottom portion 26 of enclosure 14 has walls 27, 28, 29 and 30 for enclosing the lower portion 23 not enclosed by enclosure portion 16 and a bottom member 31 for enclosing the bottom 25 of battery 12. When thermoelectric module 33 is affixed to top portion 16, surface 32 of a heat transfer structure included in thermoelectric module 33 encloses or covers the portion of the end surface 24 of battery 12 not covered by top portion 16 and bottom portion 26.

Fastener structures 34 fasten top portion 16 and bottom portion 26. When top portion 16 and bottom portion 26 and thermoelectric module 33 are fastened together, battery 12 is enclosed and at least partially insulated from hostile temperatures of the ambient atmosphere otherwise surrounding battery 12. This assists the control of the temperature of battery 12 within the predetermined temperature range by regulating the temperature of an airflow that is supplied by module thermoelectric device 33 through vent 38 into enclosure 14. The temperature of battery 12 can also be controlled by regulating the relative temperature that is directly conducted through surface 32 of thermoelectric module 33 to a portion of the adjacent surface 24 of the battery 12.

Figure 2:
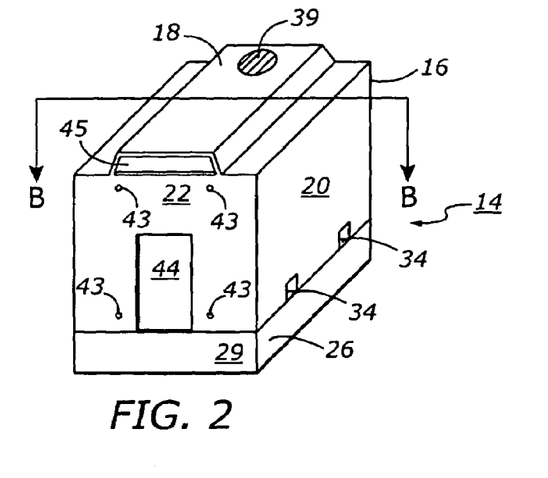
FIG. 2 is a perspective end view of a battery enclosure for the temperature control apparatus of FIG. 1.
Figure 2A:
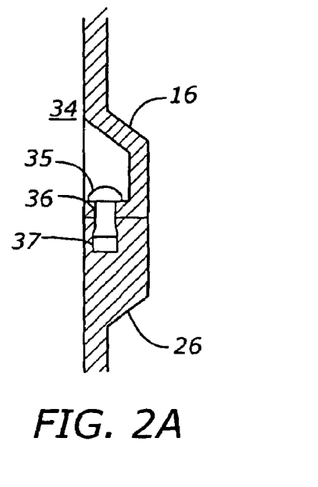
FIG. 2A is an enlarged detail view of a fastener structure for the battery enclosure of FIG. 2.

FIG. 2 is a perspective view of enclosure 14 housing the battery 12 and top portions 16 and bottom portion 26 held together by fastener structures 34. FIG. 2A shows an enlarged view of one of the four fastener structures 34 for attaching enclosure top portion 16 and bottom portion 26. Each fastener structure 34 can include a snap 35 that is shown extending through aligned apertures 36 and 37 in respective portions 16 and 26. Snaps 35 are respectively engaged or disengaged when it is desired to join or separate portions 16 and 26. However, any number of fastener configurations can be used in accordance with the present invention, such as belts with snaps or buckles, for example and without limitation.

As shown in FIG. 1, the heating or cooling air is exhausted through vent 39 of top portion 16 to allow air circulation within enclosure 14. Power supply line 40 for thermoelectric module 33 can be electrically connected through connector 41, which can be connected in a known manner to conductors passed through a surface of top portion 16 to posts 42 of battery 12, for instance. Alternatively, connector 41 can be connected to another battery or other electrical power source.

Figures 2B, 3, 4:
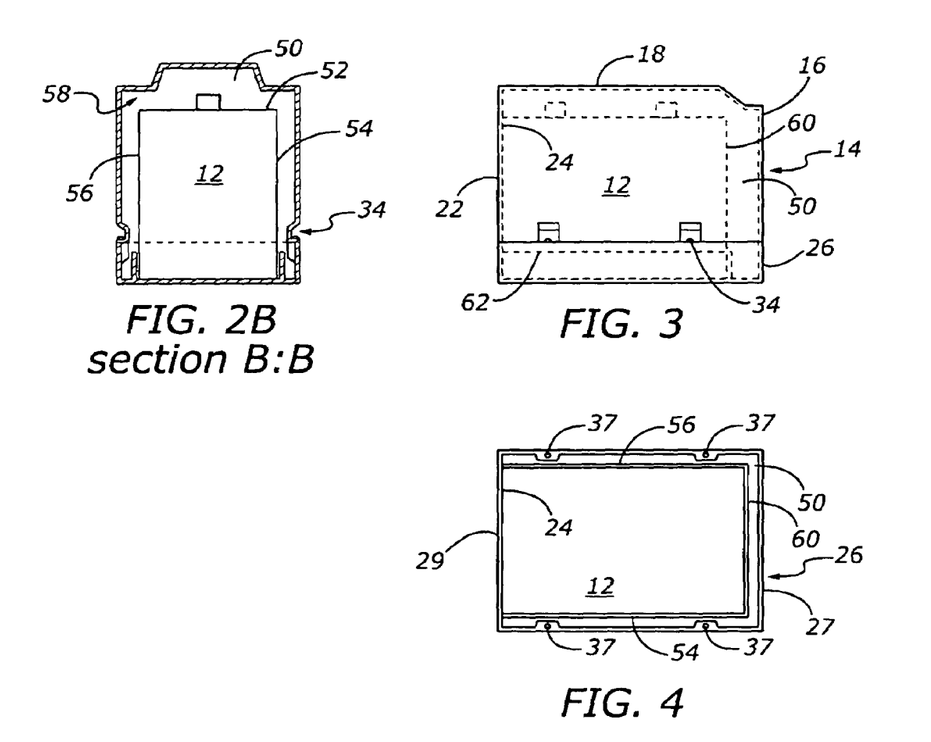
FIG. 2B is a view of cross section B-B of the battery enclosure of FIG. 2.
FIG. 3 is a side view of the battery enclosure of FIG. 2.
FIG. 4 is a plan view of the battery and the bottom portion of the battery enclosure of FIG. 2.

FIG. 2 shows the front surfaces of end walls 22 and 29 of respective portions 16 and 26 of enclosure 14. Apertures 43 are provided in the end wall 22 of top portion 16 to facilitate the mounting of the thermoelectric module 33 by a fastener (not shown), such as rivets. End wall 22 also has apertures 44 and 45. During assembly, heat transfer surface 32 of thermoelectric module 33 as shown in FIG. 1 is positioned or aligned with aperture 44 to allow heat or cold air to be conducted directly from heat transfer surface 32 through wall 22 to a portion of end surface 24 of battery 12. Thus, when apparatus 10 is assembled, surface 32 is positioned to contribute to the control of the temperature of battery 12. In addition, when apparatus 10 is assembled, vent 38 of thermoelectric module 33 as shown in FIG. 1 is aligned with aperture 45 of FIG. 2 to allow hot or cold air from thermoelectric module 33 to be circulated over other surfaces of battery 12 within enclosure 14. A cross-sectional end view taken along lines B-B of FIG. 2 is shown in FIG. 2B of the air circulation space of chamber 50 for receiving air exiting from thermoelectric module 33. Chamber 50 is located between the top surface 52 and the side surfaces 54 and 56 of battery 12 and the inside surface 58 of enclosure 14.

FIG. 3 is a side view of enclosure 14 showing the location of the back surface 60 of battery 12. Thus, chamber 50 allows the airflow from thermoelectric module 33 to pass over and thereby also heat or cool battery surfaces 52, 54, 56 and 60. A battery tray 62 for holding battery 12 is preferably installed or formed in bottom portion 26 as shown by solid lines in FIG. 1 and by dashed lines in FIG. 3. FIG. 4 is a top view of bottom portion 26 and battery 12 and shows chamber 50 surrounding battery surfaces 54, 56 and 60 and apertures 37 in portion 26 for receiving snaps 35 of fastener structure 34.

Figure 5:
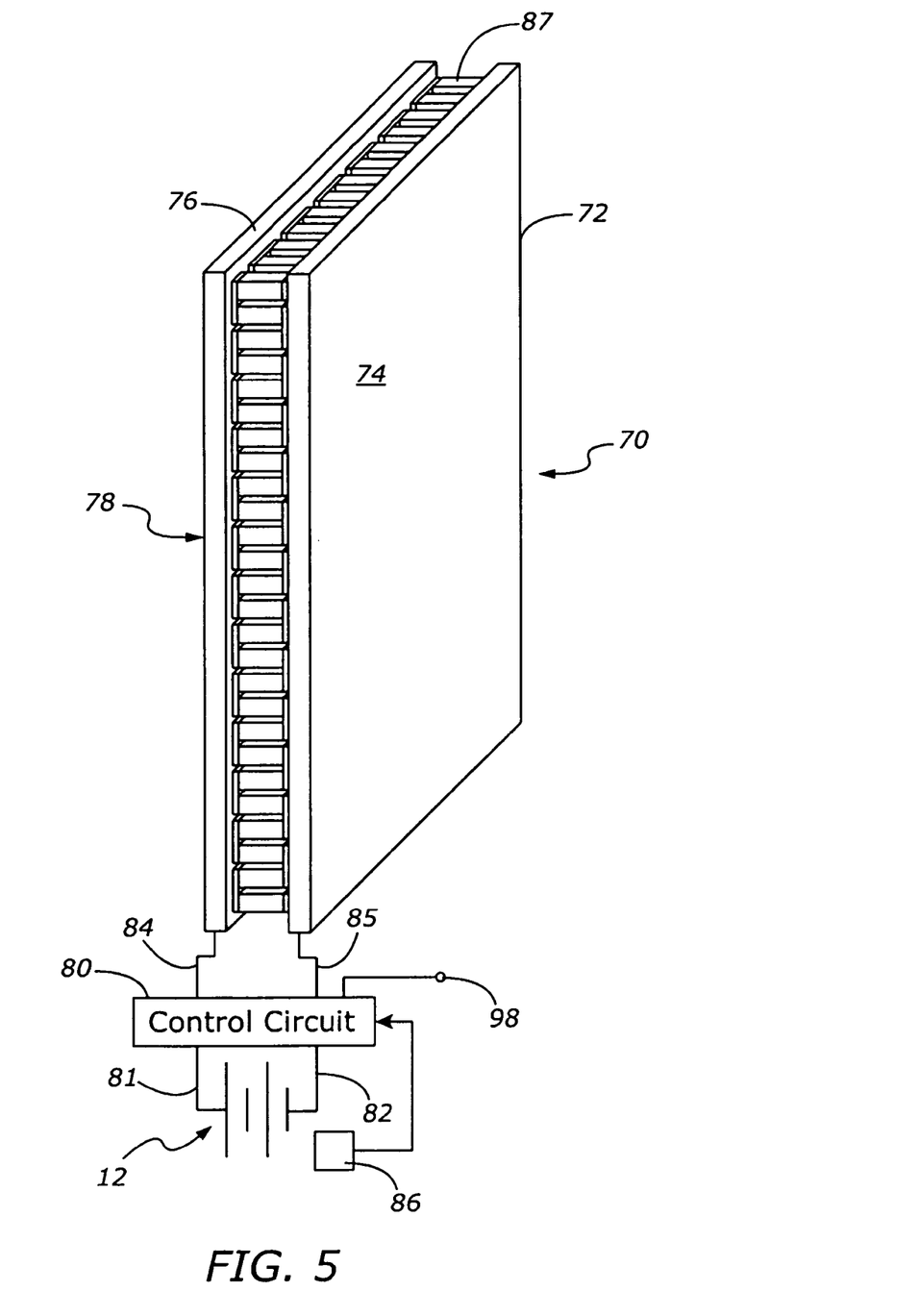
FIG. 5 is a perspective view of a thermoelectric device and a schematic diagram of control circuitry for the thermoelectric device.
Figure 8:
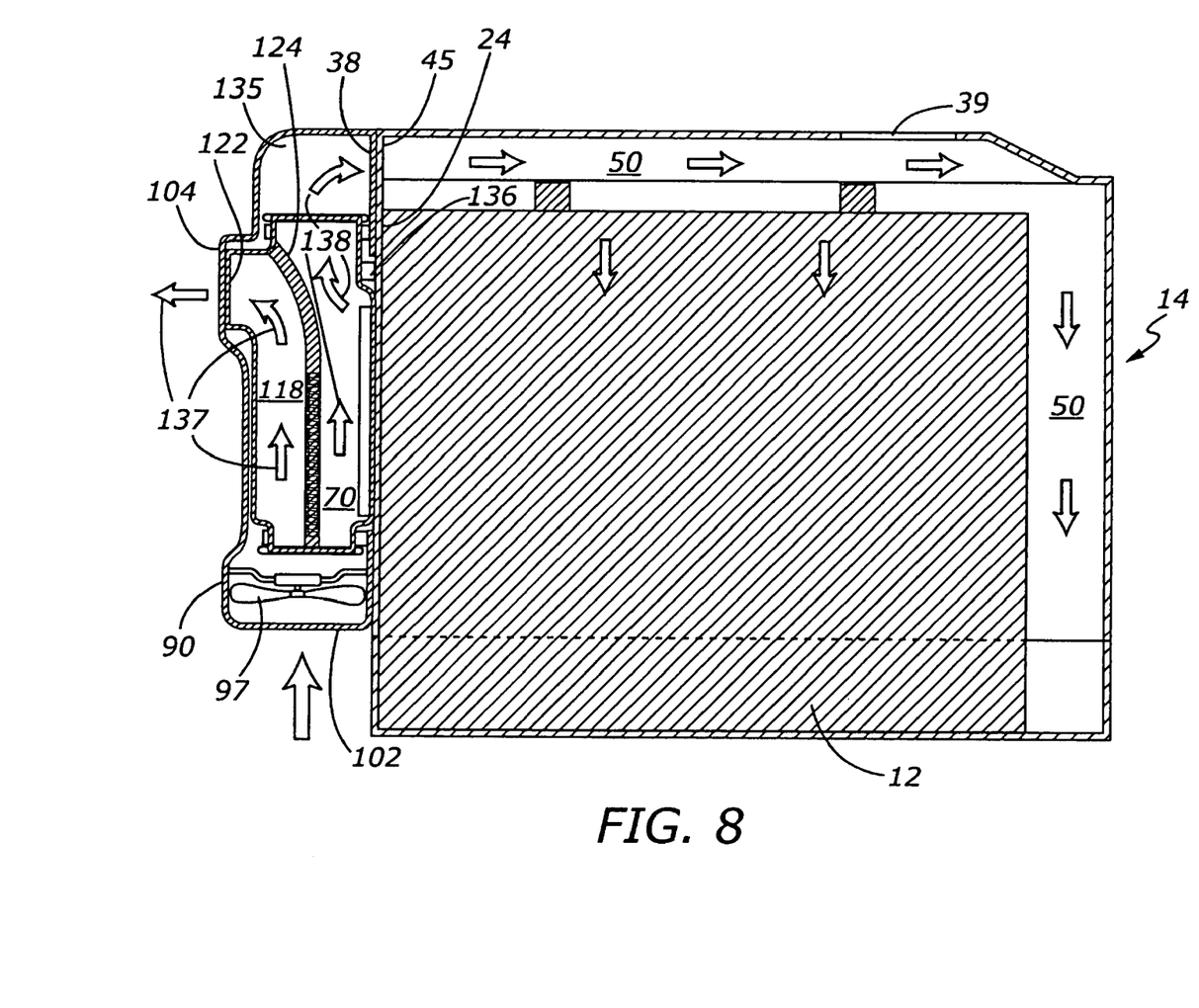
FIG. 8 is a side view showing the assembled thermoelectric module, battery enclosure and battery.

FIG. 5 is a perspective view of a conventional thermoelectric device 70 utilized by the thermoelectric module 33 as shown in FIG. 1. Thermoelectric device 70 includes a substrate 72 having a flat surface 74 that is thermally coupled by airflow to heat or cool battery 12 as shown in FIG. 8. Thermoelectric device 70 further includes another substrate 76 having another flat surface 78 that is thermally coupled by another airflow to the ambient environment as also shown in FIG. 8. Control circuit 80 electrically couples electrical current from battery 12, for instance, via input conductors 81 and 82 to output conductors 84 and 85 that are connected to thermoelectric device 70. Temperature sensor 86 monitors the temperature of battery 12 and provides a control signal to control circuit 80 indicative of the temperature of battery 12. Thermoelectric device 70 utilizes the properties of certain semiconductor materials 87 to develop a thermal gradient across substrates 72 and 76 in the presence of the current flow. Conventional thermoelectric devices utilize P-type and N-type semiconductors for the thermoelectric material 87. Generally, these materials 87 are arrayed in the rectangular assembly 70 between substrates 72 and 76. However, any number of configurations can be used in accordance with the present invention.

Thermoelectric device 70 generates a first temperature (e.g., a lower temperature) on surface 74 for cooling airflow and a second temperature (e.g., a higher temperature) that is greater than the first temperature on the other surface 78 for heating airflow in response to the electrical current passing through the thermoelectric device 70 having a first direction. Also, thermoelectric device 70 generates a third temperature (e.g., a higher temperature) on surface 74 for heating airflow and a fourth temperature that is less than the third temperature (e.g., a lower temperature) on surface 78 for cooling airflow in response to the direction of the electrical current passing through device 50 having a direction other than the first direction, such as the direction that is substantially opposite to the first direction. Control circuit 80 changes the direction of current flow through device 70 by reversing polarity in response to sensor 86 indicating that the temperature of the battery 12 has changed from exceeding an upper temperature threshold, such as positive forty-five degrees centigrade (45° C.), to falling below a lower temperature threshold, such as negative fifteen degrees centigrade (15° C.), for instance. If cooling of the battery 12 is desirable (e.g., the temperature of the battery is greater than the upper temperature threshold of the desired temperature range), then heat is transferred from the battery to the ambient environment by thermoelectric device 70. Alternatively, if heating of the battery 12 is desirable (e.g., the temperature of the battery is less than the lower temperature threshold of the desired temperature range), then heat is transferred from the ambient environment or atmosphere to battery 12 by thermoelectric device 70. If the temperature of battery 12 is within the desired temperature range (i.e., approximately between the lower temperature threshold and the upper temperature threshold), then control circuit 80 minimizes or discontinues the electrical current flow to thermoelectric device 70 to minimize heat exchange.

Figure 6:
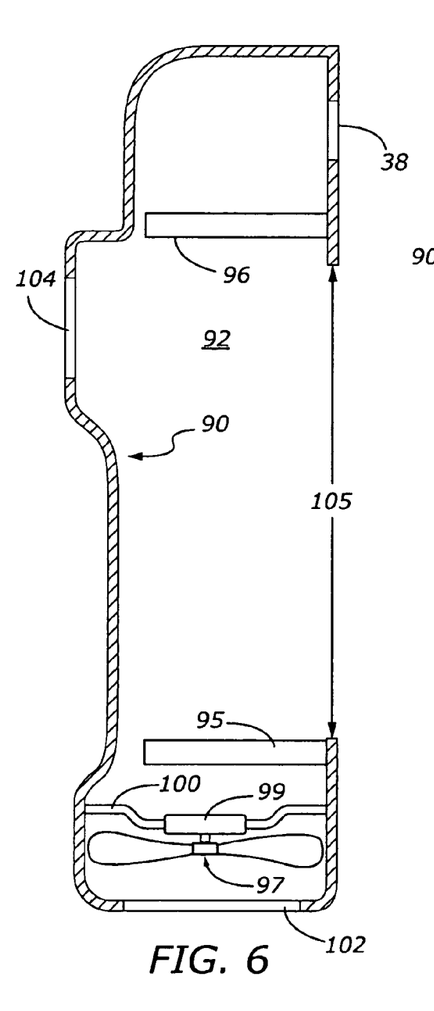
FIG. 6 is a plan view of a housing and a fan for a thermoelectric module.
Figure 6A:
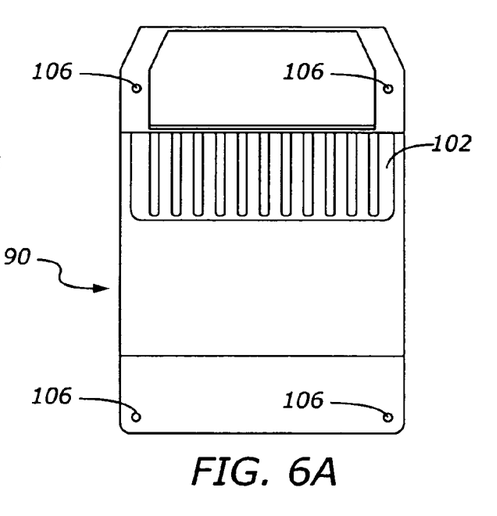
FIG. 6A is an end view of the housing of FIG. 6.

FIG. 6 shows a plan view of housing 90 of the thermoelectric module 33. Housing 90 provides an enclosure 92 for the heat exchanger assembly 94 of FIG. 7. Straps 95 and 96 are configured to hold assembly 94 in housing 90. Fan assembly 97 has an electric motor 99, which can be electrically connected between ground and fan control output terminal 98 of control circuit 80 as shown in FIG. 5. Fan assembly 97 is at least partially but preferably substantially affixed by bracket 100 to housing 90. Control circuit 80 can operate fan 97 when thermoelectric device 70 is energized. Non-shaded areas 102 and 104 of housing 90, respectively, indicate the ambient air input grill and the ambient air output grill or openings/apertures for the ambient airflow driven by fan 97. As shown in FIG. 8, vent 38 provides heated or cooled air through the input vent 45 into chamber 50 for enclosure 14 when it is desirable to heat or cool battery 12. Opening 105 shown in FIG. 6 of housing 90 allows heat transfer structure 130 of FIG. 7 to be aligned with the enclosure opening 44 shown in FIG. 2. FIG. 6A is an end view of housing 90 showing the outside surface of ambient air input grill 102. Holes 106 facilitate the mounting of housing 90 to holes 43 of top portion 16 of insulated case 14 by rivets or other fastener structures as previously mentioned in this detailed description.

Figure 7:
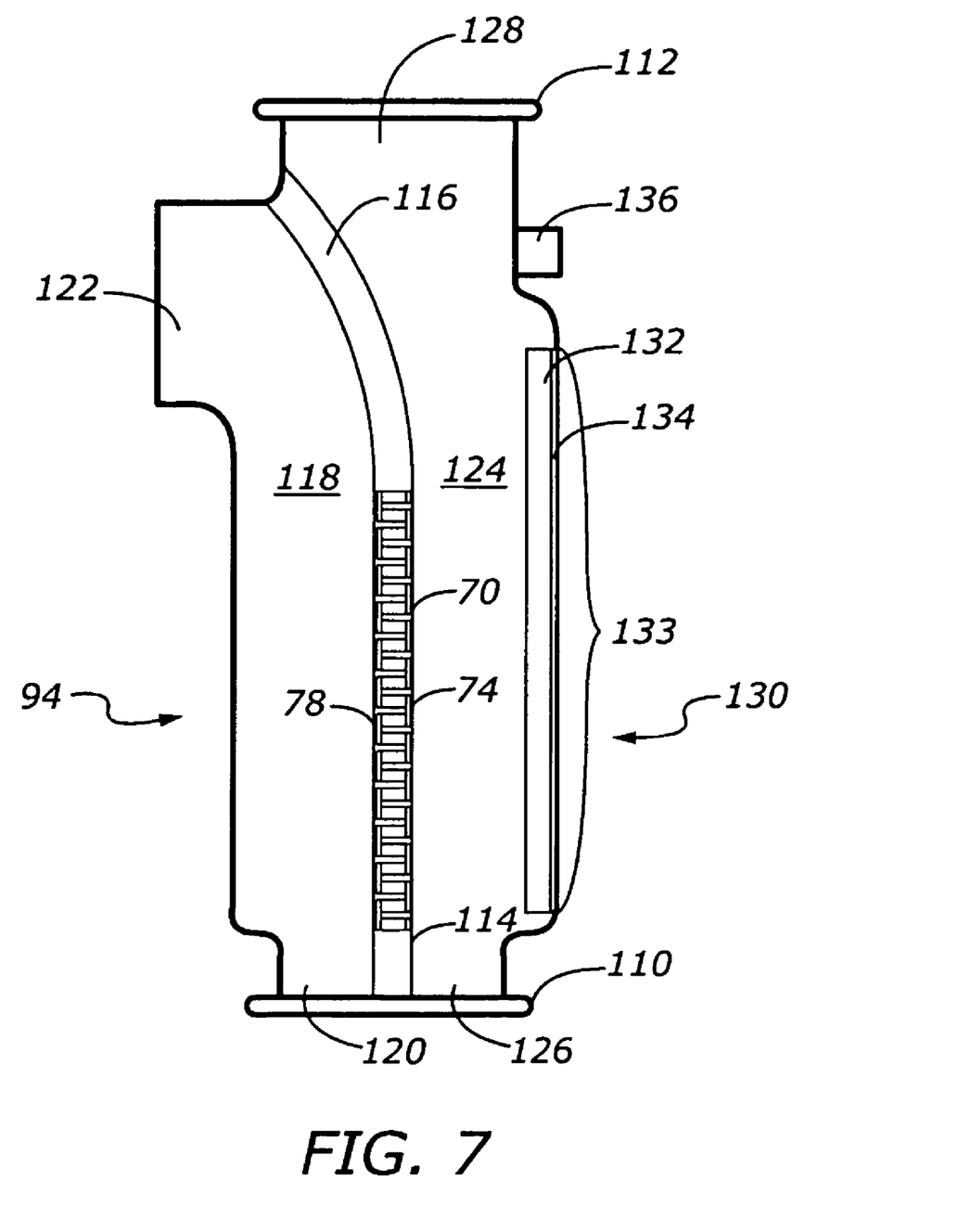
FIG. 7 is a plan view of a heat exchanger for the thermoelectric module of FIG. 6.

FIG. 7 is a plan view of heat exchanger assembly 94. Straps 110 and 112 are arranged to be fastened to respective straps 95 and 96 of housing 90 of FIG. 6 for holding assembly 94 in housing 90. Thermoelectric assembly 94 includes the thermoelectric device 70, which is attached to and held in place by baffles 114 and 116. Ambient air duct 118 conducts ambient air from input port 120 through the interior region past surface 78 of device 70 to output port 122. Battery temperature control duct 124 conducts air through the interior region from input port 126 to output port 128 past surface 74 of device 70 and past heat transfer structure 130. As previously described in this detailed description, such airflows can be either heated or cooled by device thermoelectric 70. If the battery temperature control airflow is heated by surface 74 of thermoelectric device 70 in duct 124, then the airflow in duct 118 is cooled by surface 78 and vice versa. The airflow in duct 118 thermally couples surface 78 of thermoelectric device 70 to the ambient atmosphere. Heat transfer structure 130 includes a thermal spreader 132 and a thermal interface layer 134 for conducting heat either to or away from battery surface 24. The thermal spreader 132 is formed from a heat conducting material such as aluminum having a thickness of five tenths a millimeter (0.5 mm), for example. The layer 134 can be an adhesive backed fiber material placed on the surface of spreader 132 for interfacing with end portion 24 of battery 12 and for protecting spreader 132 from abrasion by battery 12. Heat transfer structure 130 is affixed in an opening in air duct 124 and forms a portion of the wall of duct 124. Control circuit 80 and battery temperature control sensor 86 are included in package 136 on the outside of duct 124.

FIG. 8 shows an assembly including housing 90, ducts 118 and 124, battery 12, package 136 and battery enclosure 14. The position of package 136, which includes control circuit 80 and sensor 86 enables control circuit 80 to be thermally coupled by sensor 86 to battery 12. Control circuit 80 is electrically coupled between the current source or battery 12 and thermoelectric device 70 so that control circuit 80 selectively controls the current through thermoelectric device 70 in response to the temperature of battery 12 indicated by sensor 86. Fan 97 draws ambient air in through grill 102 and pushes the airflow through the interior region of duct 118 and out of grill 122 as indicated by arrows 137. Furthermore, fan 97 draws battery temperature control air in through grill 102 and pushes the airflow through the interior region of duct 124 and through a portion 135 of housing 90 and through abutting vents 38 and 45 into chamber 50 of enclosure 14 as indicated by arrows 138. Thus portion 135 of housing 90 completes the airflow path from output port 128 of FIG. 7. to chamber 50 and provides an airflow path that thermally couples surface 74 shown in FIG. 7 of thermoelectric device 70 to battery 12. Vent 45 facilitates the circulation of the temperature controlling air around the surfaces of battery 12. The thermoelectric device 70 exchanges heat between the airflows in the interior regions of air ducts 118 and 124 to regulate the temperature of the battery 12 and to maintain the temperature of the battery 12 within the predetermined desired temperature range.

Figure 9:
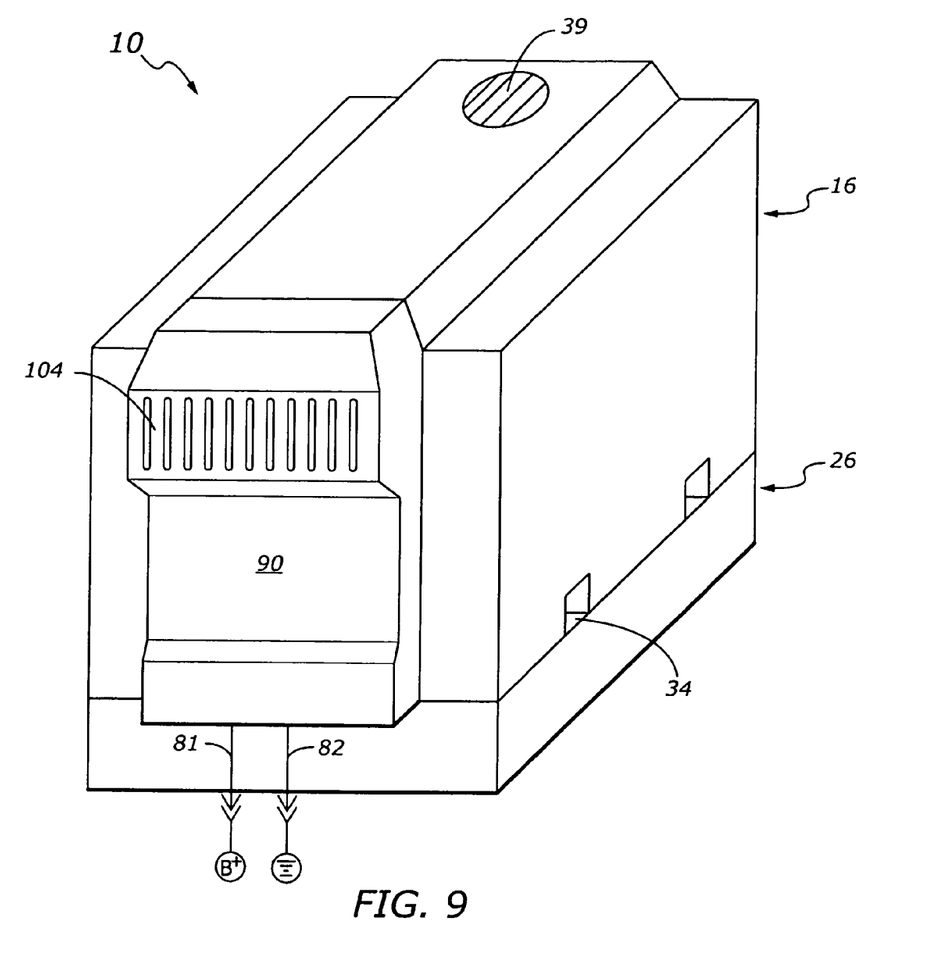
FIG. 9 is a perspective view of the assembled temperature control apparatus of FIG. 1.

Opening 105 of housing 90 of FIG. 6 is aligned with opening 44 of enclosure 14 of FIG. 2 and with opening 133 of FIG. 7. This enables heat transfer structure 130 to directly transfer or conduct heat or cold through the interior region of duct 124 between adjacent surface 24 of battery 12 and surface 74 of device 70 as shown in FIG. 8. FIG. 9 is a perspective view of the assembled temperature control apparatus 10 showing another view of ambient air exit grill 104 of housing 90. Electrical power input conductors 81 and 82 for control circuit 80 of package 136 are shown coming out of housing 90 of module 33. Conductors 81 and 82 connect circuit 80 to a separate power source.

In view of the foregoing, it should be appreciated that there has been provided an improved method and an apparatus 10 that controls the temperature of battery 12 and maintains the temperature within a predetermined temperature range. This protects the battery 12 from prolonged exposure to excessively hot and cold temperatures. Such temperature control results in numerous advantages such as increased performance and longevity for battery 12. The protection is accomplished in an inexpensive, simple, efficient, reliable and expeditious manner.

While at least one exemplary embodiment has been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims and the legal equivalents thereof.

What is claimed is:

1. An apparatus for controlling the temperature of an automobile battery to maintain the temperature within a predetermined temperature range, the apparatus comprising:

an enclosure for housing said automobile battery, said enclosure having at least one first aperture;

an electrical current source configured to generate an electrical current with a direction;

a thermoelectric device having a first surface and a second surface, said thermoelectric device configured to generate a first temperature on said first surface and a second temperature on said second surface that is greater than said first temperature if said direction of said electrical current has a first direction and said thermoelectric device configured to generate a third temperature on said first surface and a fourth temperature on said second surface that is less than said third temperature if said direction of electrical current has a second direction;

a control circuit configured to adjust said direction of said electrical current generated by said electrical current source in response to relationship of the temperature of the automobile battery to the predetermined temperature range;

a heat exchanger having a first air duct with a first airflow that is configured to thermally couple said first surface of said thermoelectric device to the ambient atmosphere and a second air duct with a second airflow that is configured to thermally couple said second surface of said thermoelectric device to the automobile battery, said first air duct and said second air duct each having an interior region;

a housing configured to house said thermoelectric device and said heat exchanger, said housing having at least one second aperture aligned with said at least one first aperture in said enclosure to couple said second air duct to said enclosure;

a fan located in said housing, said fan being operable to force ambient air through said interior regions of said first air duct and said second air duct, past said first surface and said second surface of said thermoelectric device, to enable said air flows to provide said thermal coupling of said first surface of said thermoelectric device to the ambient atmosphere and said thermal coupling of second surface of said thermoelectric device to the automobile battery.

2. The apparatus of claim 1 wherein the predetermined temperature range is between about negative twenty degrees centigrade (−20° C.) and about positive fifty degrees centigrade (50° C.).

3. The apparatus of claim 1 further including a heat transfer structure for thermally connecting an interior region of said second air duct directly to at least a portion of a surface of the automobile battery.

4. The apparatus of claim 3 wherein said at least one first aperture is configured to provide access to said portion of the surface of the automobile battery, and said heat transfer structure being located in said at least one first and second apertures between said portion of the surface of the automobile battery and said interior region of said second air duct to further enable said thermoelectric device to exchange heat between said airflows of said first and second air ducts and the automobile battery.

5. The apparatus of claim 4 wherein said heat transfer structure includes a thermal interface layer located between said portion of the automobile battery and said interior region of said second air duct.

6. The apparatus of claim 4 wherein said heat transfer structure includes a thermal spreader located between said potion of the automobile battery and said interior region of said second air second duct.

7. An apparatus for controlling the temperature of a lead acid automobile battery to maintain the temperature within a temperature range of about negative twenty degrees centigrade (−20° C.) and about positive fifty degrees centigrade (50° C.), the apparatus comprising:

an enclosure for housing the lead acid automobile battery, said enclosure having at least one first aperture;

an electrical current source configured to generate an electrical current with a direction;

a thermoelectric device having a first surface and a second surface, said thermoelectric device configured to generate a first temperature on said first surface and a second temperature on said second surface that is greater than said first temperature if said direction of said electrical current has a first direction and said thermoelectric device configured to generate a third temperature on said first surface and a fourth temperature on said second surface that is less than said third temperature if said direction of electrical current has a second direction; a control circuit configured to adjust said direction of said electrical current generated by said electrical current source in response to relationship of the temperature of the lead acid automobile battery to the temperature range of about negative twenty degrees centigrade (−20° C.) and about positive fifty degrees centigrade (50° C.);

a heat exchanger having a first air duct with a first airflow that is configured to thermally couple said first surface of said thermoelectric device to the ambient atmosphere and a second air duct with a second airflow that is configured to thermal couple said second surface of said thermoelectric device to the lead acid automobile battery, said first air duct and said second air duct each having an interior region;

a housing configured to house said thermoelectric device and said heat exchanger, said housing having at least one second aperture aligned with said at least one first aperture in said enclosure to couple said second air duct to said enclosure; and a fan located in said housing, said fan being operable to force ambient air through said interior regions of said first air duct and said second air duct, past said first surface and said second surface of said thermoelectric device, to enable said air flows to provide said thermal coupling of said first surface of said thermoelectric device to the ambient atmosphere and said thermal coupling of second surface of said thermoelectric device to the automobile battery.

8. A method for controlling the temperature of an automobile battery to maintain the temperature within a predetermined temperature range, said automobile battery being positioned in an enclosure with at least one first aperture, the method comprising the steps of:

generating a first temperature on a first surface of a thermoelectric device if an electrical current passing through said thermoelectric device has a first direction, said thermoelectric device being housed in a housing with at least one second aperture;

generating a second temperature on a second surface of said thermoelectric device that is greater than said first temperature if said electrical current passing through said thermoelectric device has said first direction;

generating a third temperature on said first surface of said thermoelectric device if said electrical current passing through said thermoelectric device has a second direction;

generating a fourth temperature on said second surface of said thermoelectric device that is less than said third temperature if said electrical current passing through said thermoelectric device has said second direction;

thermally coupling said first surface of said thermoelectric device to the ambient atmosphere through a first air duct with an interior region;

thermally coupling said second surface of said thermoelectric device to the surface of the automobile battery through a second air duct with an interior region by aligning said at least one second aperture of said housing with said at least one first aperture of said enclosure, said first air duct and said second air duct being positioned in a heat exchanger that is positioned within said housing;

forcing ambient air through said interior regions of said first air duct and said second air duct, past said first surface and said second surface of said thermoelectric device, to enable said air flows to provide said thermal coupling of said first surface of said thermoelectric device to the ambient atmosphere and said thermal coupling of second surface of said thermoelectric device to the automobile battery;

measuring the temperature of the automobile battery; and controlling said electrical current passing through said thermoelectric device in response to the measurement of the temperature of the automobile battery and a relationship of the temperature of the automobile battery to the predetermined temperature range.

9. The method of claim 8 further comprising the step of at least partially insulating the automobile battery with a thermally insulating enclosure.

10. The method of claim 8, further comprising the steps of thermally connecting an interior region of said second air duct to at least a portion of a surface of the automobile battery.

11. The method of claim 8, wherein the predetermined temperature range is between about negative twenty degrees centigrade (−20 C.) and about positive fifty degrees centigrade (50° C.).

* * * * *